United States Patent
Chang et al.

(10) Patent No.: US 8,022,345 B1
(45) Date of Patent: Sep. 20, 2011

(54) ADAPTIVE OPTICS SYSTEMS USING PIXELATED SPATIAL PHASE SHIFTERS

(75) Inventors: Peter Chang, San Jose, CA (US);
Avinash A. Honkan, Fremont, CA (US);
Nat Shankar, San Jose, CA (US);
Richard J. Tansey, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 375 days.

(21) Appl. No.: 12/426,159

(22) Filed: Apr. 17, 2009

Related U.S. Application Data

(60) Provisional application No. 61/054,448, filed on May 19, 2008.

(51) Int. Cl.
  *G02F 1/01* (2006.01)
  *G02B 27/14* (2006.01)
  *G01J 1/20* (2006.01)
  *G01B 11/02* (2006.01)

(52) U.S. Cl. .............. 250/201.9; 359/279; 359/629; 356/450; 356/512

(58) Field of Classification Search .............. 250/201.9; 359/279, 290, 298, 316, 618, 629, 639; 356/450, 356/495, 489, 511–512
See application file for complete search history.

(56) References Cited

U.S. PATENT DOCUMENTS

| | | | |
|---|---|---|---|
| 6,304,330 B1 * | 10/2001 | Millerd et al. | 356/521 |
| 6,552,808 B2 * | 4/2003 | Millerd et al. | 356/521 |
| 6,818,876 B1 * | 11/2004 | Pringle, Jr. | 250/201.9 |
| 6,937,381 B2 * | 8/2005 | Kitamura et al. | 359/279 |
| 7,129,455 B2 * | 10/2006 | Webb et al. | 250/201.9 |
| 7,170,611 B2 * | 1/2007 | Millerd et al. | 356/491 |
| 7,230,717 B2 * | 6/2007 | Brock et al. | 356/495 |
| 7,283,251 B1 | 10/2007 | Tansey | |
| 7,298,497 B2 * | 11/2007 | Millerd et al. | 356/512 |
| 7,402,785 B2 * | 7/2008 | Barchers | 250/201.9 |
| 7,583,425 B1 * | 9/2009 | Williams et al. | 359/29 |
| 7,764,417 B1 * | 7/2010 | Chang et al. | 359/279 |
| 7,777,895 B2 * | 8/2010 | Medower et al. | 356/521 |
| 2002/0003628 A1 * | 1/2002 | James et al. | 356/521 |
| 2003/0053071 A1 * | 3/2003 | James et al. | 356/491 |

(Continued)

OTHER PUBLICATIONS

Millerd et al., "Pixelated Phase-Mask Dynamic Interferometer," *Interferometry XII: Techniques and Analysis*, Proc. of SPIE (2004) vol. 5531, pp. 304-314.

*Primary Examiner* — John Lee
(74) *Attorney, Agent, or Firm* — McDermott Will & Emery LLP

(57) ABSTRACT

An adaptive optics system comprises a spatial light modulator, a beamsplitter, a pixelated spatial phase shifter, a beam combiner, an imaging device, and a processor. The spatial light modulator can modulate an incoming beam with an aberrated wavefront. The beamsplitter can receive the modulated beam and divide the modulated beam into a first beam and a second beam. The pixelated spatial phase shifter can spatially phase shift the second beam by at least two phases. The beam combiner can interfere the spatially phase shifted second beam with the first beam to form at least two interferograms on the imaging device, which can capture an image of the at least two interferograms in a single frame. The processor can determine the aberrated wavefront based on the at least two interferograms and provide one or more control signals to the spatial light modulator to mitigate aberrations in the aberrated wavefront.

20 Claims, 16 Drawing Sheets

U.S. PATENT DOCUMENTS

| | | | |
|---|---|---|---|
| 2005/0006559 A1* | 1/2005 | Smith | 250/201.9 |
| 2005/0045801 A1* | 3/2005 | Smith | 250/201.9 |
| 2005/0046865 A1* | 3/2005 | Brock et al. | 356/495 |
| 2006/0049331 A1* | 3/2006 | Smith | 250/201.9 |
| 2006/0132795 A1* | 6/2006 | Millerd et al. | 356/495 |
| 2006/0227402 A1* | 10/2006 | Maram et al. | 359/279 |
| 2006/0227440 A1* | 10/2006 | Gluckstad | 359/885 |
| 2007/0158529 A1* | 7/2007 | Smith | 250/201.9 |
| 2007/0176077 A1* | 8/2007 | Barchers | 250/201.9 |
| 2009/0250591 A1* | 10/2009 | Yamashita et al. | 250/201.9 |
| 2010/0245976 A1* | 9/2010 | George et al. | 359/291 |

* cited by examiner

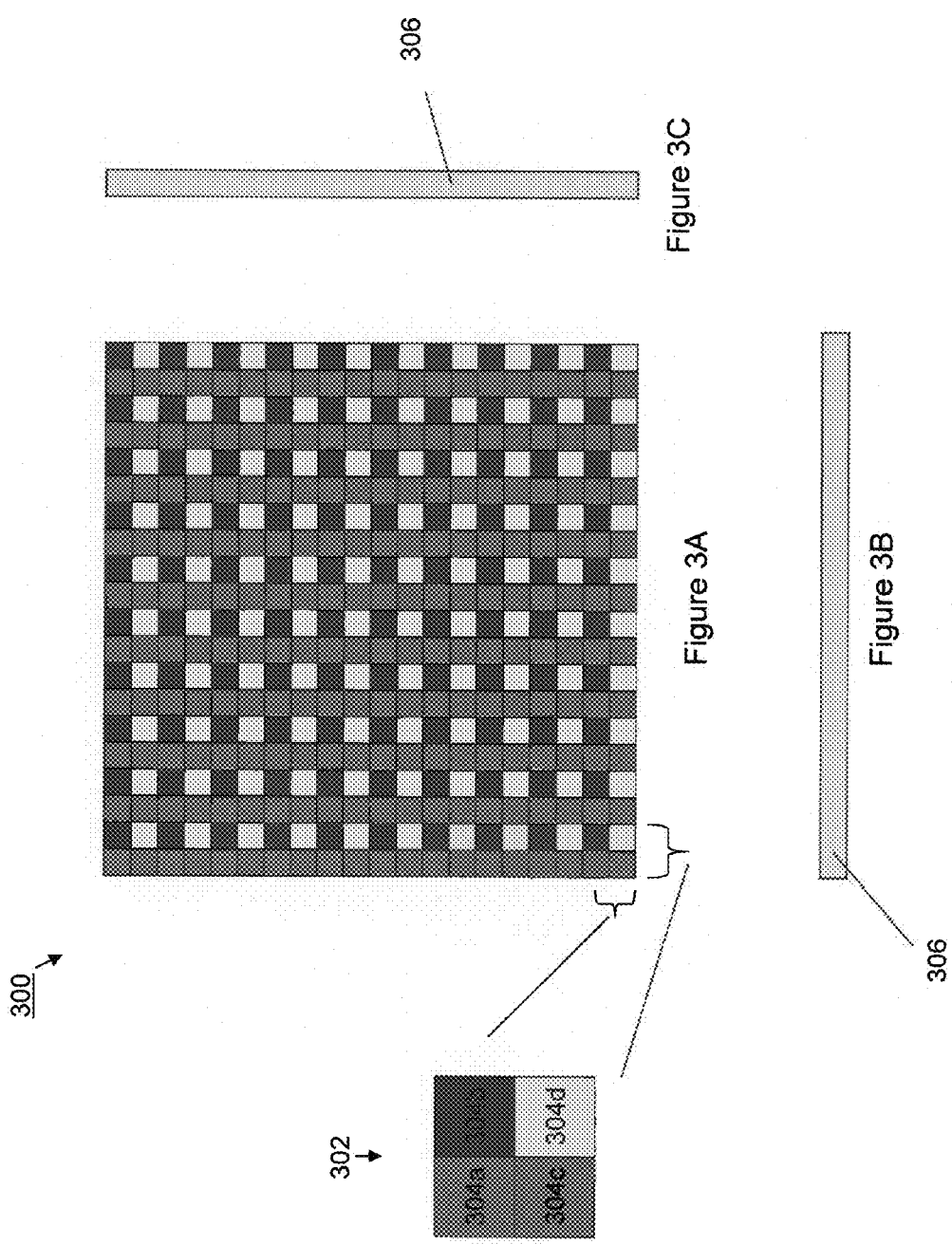

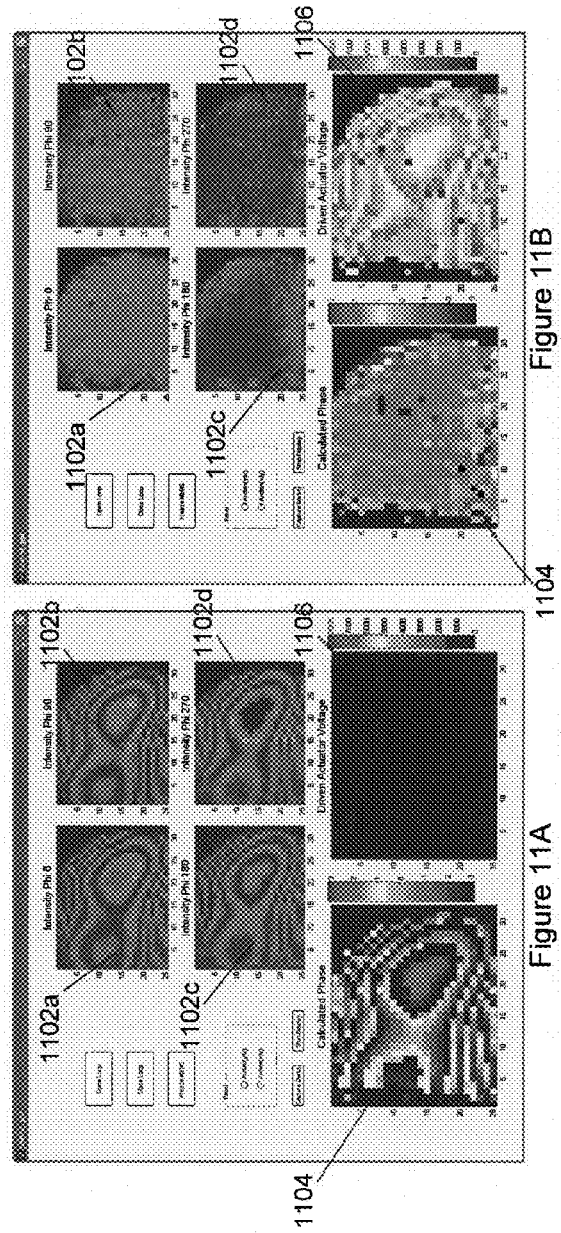
Figure 11A
Figure 11B
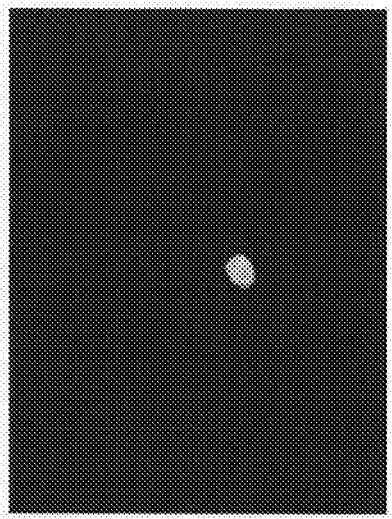
Figure 11D
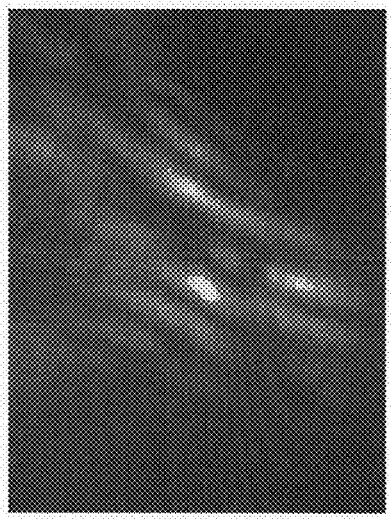
Figure 11C

ADAPTIVE OPTICS SYSTEMS USING PIXELATED SPATIAL PHASE SHIFTERS

CROSS-REFERENCES TO RELATED APPLICATIONS

The present application claims the benefit of U.S. Provisional Patent Application Ser. No. 61/054,448, entitled "Pixilated Spatial Phase Shifter in an Adaptive Optic System," filed May 19, 2008, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to adaptive optics systems and, in particular, relates to adaptive optics systems using pixelated spatial phase shifters.

BACKGROUND

Adaptive optics ("AO") are used to control deformable mirrors to compensate for phase aberrations introduced, for example, by the turbulence in the Earth's atmosphere or by the optical elements between a distant object and its local sensor. In an adaptive optics system where a deformable mirror is used, the wavefront correction capability of the system can often be restricted by the limited stroke of the mirror. In specific cases where a deformable mirror is used to correct the tip/tilt, or to direct the beam direction, the range of the tip/tilt angle achievable is extremely small. Large-stroke deformable mirrors are available, but are only able to operate at slower speeds (i.e., with lower bandwidth).

SUMMARY

According to one aspect of the disclosure, an adaptive optics system is provided with a spatial phase shifter. The system is capable of providing simultaneous phase shifts of optical beams, enabling a detector to simultaneously measure the intensities of multiple interferograms to deduce the phase of a wavefront of an optical beam for correcting its aberrations.

In accordance with one aspect of the present invention, an adaptive optics system comprises a spatial light modulator configured to modulate an incoming beam with an aberrated wavefront. The adaptive optics system also comprises a beamsplitter configured to receive the modulated beam from the spatial light modulator. The beamsplitter may also be configured to divide the modulated beam into a first beam and a second beam. The adaptive optics system also comprises a pixelated spatial phase shifter configured to spatially phase shift the second beam by at least two phases. The adaptive optics system also comprises a beam combiner configured to interfere the spatially phase shifted second beam with the first beam to form at least two interferograms on an imaging device. The adaptive optics system also comprises the imaging device, which is configured to capture an image of the at least two interferograms in a single frame. The adaptive optics system also comprises a processor configured to determine the aberrated wavefront based on the at least two interferograms. The processor may also be configured to provide one or more control signals to the spatial light modulator to mitigate aberrations in the aberrated wavefront.

According to another aspect of the present invention, a method of performing adaptive optics correction comprises modulating an incoming beam with an aberrated wavefront. The method also comprises dividing the modulated beam into a first beam and a second beam. The method also comprises spatially phase shifting the second beam by at least two phases. The method also comprises interfering the spatially phase shifted second beam with the first beam to form at least two interferograms. The method also comprises capturing an image of the at least two interferograms in a single frame. The method also comprises determining the aberrated wavefront based on the at least two interferograms. The method also comprises providing one or more control signals to mitigate aberrations in the aberrated wavefront.

According to yet another aspect of the present invention, an adaptive optics system comprises means for modulating an incoming beam with an aberrated wavefront. The adaptive optics system also comprises means for dividing the modulated beam into a first beam and a second beam. The adaptive optics system also comprises means for spatially phase shifting the second beam by at least two phases. The adaptive optics system also comprises means for interfering the spatially phase shifted second beam with the first beam to form at least two interferograms. The adaptive optics system also comprises means for capturing an image of the at least two interferograms in a single frame. The adaptive optics system also comprises means for determining the aberrated wavefront based on the at least two interferograms. The adaptive optics system also comprises means for providing control signals to the means for modulating to mitigate aberrations in the aberrated wavefront.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

FIGS. 3A, 3B and 3C illustrate an example of a pixelated spatial phase shifter, in accordance with one embodiment of the present invention.

FIGS. 11A, 11B, 11C and 11D illustrate an example of performance results of an operation of an adaptive optics system utilizing a pixelated spatial phase shifter, in accordance with one embodiment of the present invention.

DETAILED DESCRIPTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as not to obscure the present invention.

In an adaptive optics ("AO") system where the wavefront of an optical beam is controlled by an adaptive optic component such as a microelectromechanical systems ("MEMS") element or a deformable mirror, an interferometer may be used where the signal beam is combined with a reference beam. The intensities of the resulting interferogram can be measured to deduce the phase of the wavefront of the signal beam, which is used for controlling the adaptive optic component. However, limitations and delays associated with making these measurements reduces the operating speed of the adaptive optics system (i.e., lower bandwidth). For example, since the intensity of the interferogram is a function of the phase difference between the signal and reference beams as well as of their intensities, at least three measurements are needed for each point to resolve the phase. One way to accomplish this is to use a temporal phase shifter, whereby the phase of the reference beam is shifted multiple times in sequence for a known amount, while the intensities of the interferogram is measured after each shift. One drawback of this approach is its bandwidth limitation.

Figure 1:
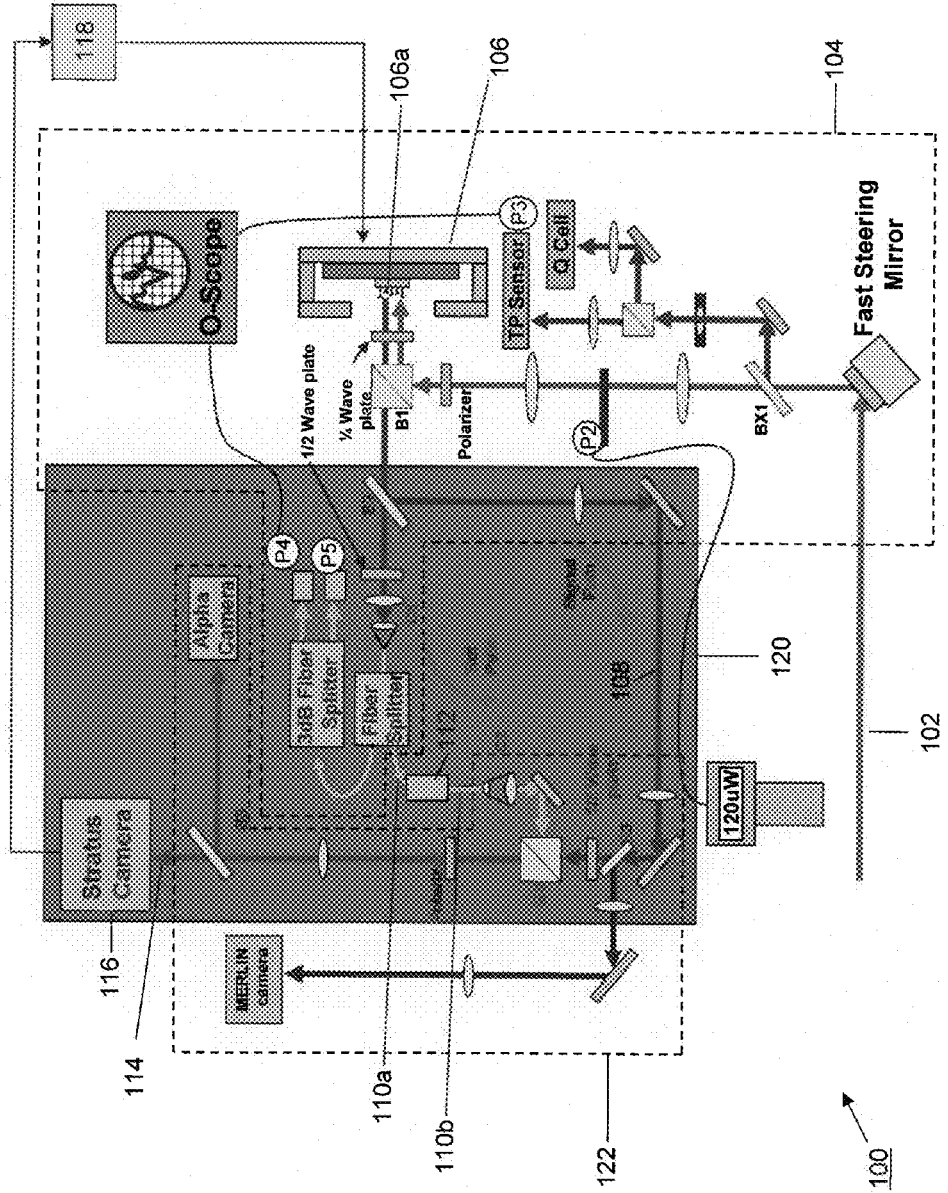
FIG. 1 illustrates an example of an adaptive optics system for correcting a wavefront.

FIG. 1 illustrates an example of one approach for correcting a wavefront of an optical beam utilizing an adaptive optics system 100. Adaptive optics system 100 includes input optics system 104, output optics system 122, and interferometer 120. Interferometer 120 may be, for example, a wave front sensor self referencing interferometer ("SRI"). Input optics system 104, output optics system 122, and interferometer 120 include various optical components such as beamsplitters, beamcombiners, mirrors, polarizers, wave plates, lenses, fiber splitters, or other optical components to route and direct optical beams. Input optics system 104, output optics system 122, and interferometer 120 may also include devices for monitoring or measuring the optical beams such as a total power ("TP") sensor, a quad cell ("Q Cell") sensor, oscilloscope, a power meter, or various imaging devices. Imaging devices may include cameras to record and/or display the optical beams, such as a Merlin, Alpha, or Stratus camera. Input optics system 104 includes a spatial light modulator ("SLM") 106, which mitigates the aberrations of incoming beam 102.

SLM 106 may be a pixelated MEMS SLM. A pixelated MEMS SLM comprises a plurality of actuators 106a, each of which can be actuated independently, without affecting neighboring actuators. Accordingly, such a modulator can be utilized to perform precise wavefront correction, and can also be used to provide tip/tilt or beam direction with large angles. This is due in part to the fact that when a wavefront or a portion thereof is shifted by $2\pi$ or a multiple thereof, the wavefront remains unchanged (for monochromatic light). Accordingly, even when the overall wavefront deviates from the desired wavefront by many times that of $2\pi$, each actuator only needs to move within its range of movement, which may be no more than $2\pi$.

Input optics system 104 may split incoming beam 102 into reference beam 110a and measurement beam 108 (i.e., signal beam). Reference beam 110a passes through a phase modulator 112, which produces a phase-shifted reference beam 110b. According to one approach, phase modulator 112 uses a temporal method to shift the phase by $\pi/2$. Output optics system 122 receives and combines phase-shifted reference beam 110b and measurement beam 108, and then directs combined beam 114 to an image plane of imaging device 116. Imaging device 116 may be a CCD, a CMOS, or any other suitable imaging device known to those of skill in the art. For example, imaging device 116 may be a Stratus camera.

By interfering the measurement beam 108 with phase-shifted reference beam 110b, an interferogram is formed in imaging device 116, which captures an image of the interferogram and provides it to processor 118. Processor 118 may be configured to reconstruct the wavefront of incoming beam 102 based upon captured interferograms, and may provide one or more control signals to update or adjust SLM 106 to correct the aberrations in incoming beam 102.

The intensity of the interferogram may be a function of the phase difference between measurement beam 108 and reference beam 110a as well as each of the intensities of measurement beam 108 and reference beam 110a. Thus, at least three measurements may be needed to calculate the phase between reference beam 110a and measurement beam 108. Consequently, imaging device 116 may need to make at least three measurements before processor 118 can reconstruct the wavefront of incoming beam 102. This can be done by phase shifting reference beam 110a a number of times. Imaging device 116 may make multiple sequential measurements depending on the number of times reference beam 110a is phase-shifted. Because four measurements make computing the intensity of the interferogram convenient, reference beam 110a can be phase-shifted four times. As a result, four sequential measurements can be made at imaging device 116, resulting in four interferograms being captured, with one interferogram captured per camera frame. Processor 118 may then reconstruct the wavefront of incoming beam 102 based upon the four captured interferograms and provide control signals to update or adjust SLM 106 to correct the aberrations in incoming beam 102. In this example, an assumption is made where the wavefront does not change for each correction of the wavefront.

Figure 2:
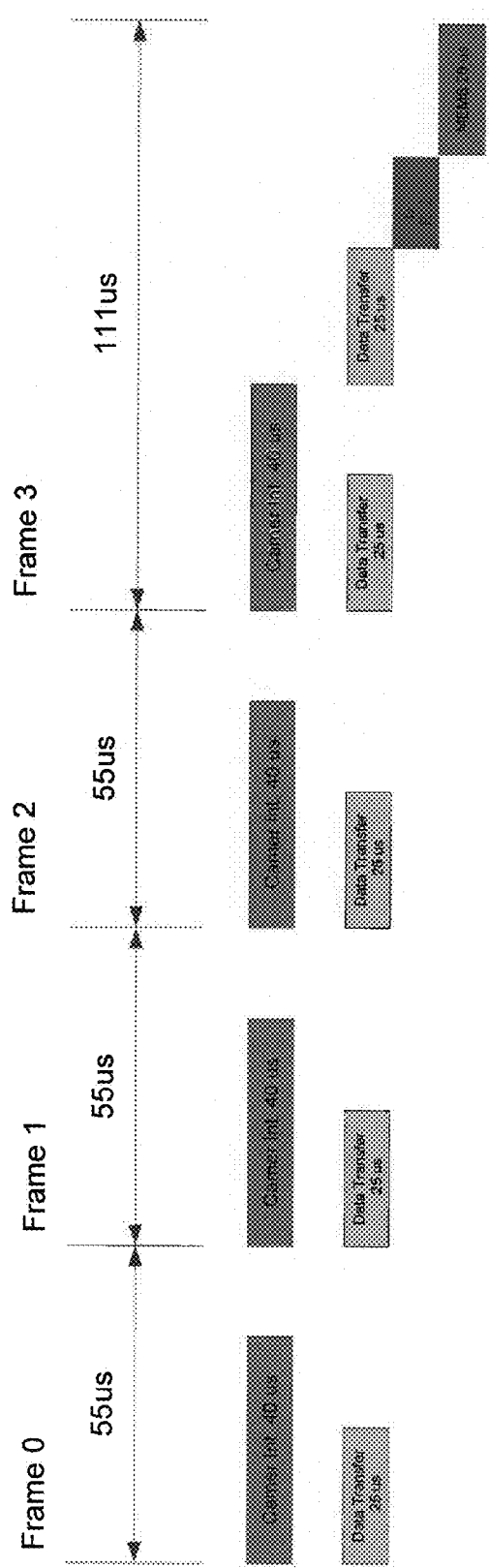
FIG. 2 is an example of a timing illustration for correcting a wavefront utilizing an adaptive optics system.

FIG. 2 is an example of a timing illustration for correcting the wavefront of incoming beam 102 utilizing adaptive optics system 100. As discussed above, four measurements are made by imaging device 116. Imaging device 116 may be a wave front sensor camera operating at a particular resolution. Each time imaging device 116 makes a measurement, a delay is incurred which is represented by a frame. The delay may come from a variety of sources such as the camera's integration time, which in this example is 40 µs, or from time incurred by data transfer such as by recording the interferogram or transmitting the captured interferogram data to processor 118. The data transfer time is 25 µs in this example. Delay may also come from other sources such as the transition time it takes imaging device 116 to begin making another measurement. In some instances, the delay may overlap with each other. In this example, frame 0, frame 1, and frame 2 (representing the first three measurements by imaging device 118) each incur a delay of 55 µs. Frame 3 (representing the last measurement) incurs a delay of 111 µs because of the added time for transmitting the captured interferogram data to processor 118, processing time by processor 118 (i.e., DSP SRI 20 µs), and the time it takes to adjust SLM 106 (i.e., MEMS 26 µs) to correct the aberrations in incoming beam 102.

Thus, in this illustration, the total time for updating SLM 106 with adaptive optics system 100 using phase modulator 112 for providing different phase shifts to reference beam 110a (i.e., temporal phase shifting), is 276 µs (3.6 kHz). This scheme may suffer from bandwidth limitation issues, as SLM 106 is updated only every four camera frames. In accordance with one aspect of the present invention, a spatial phase shifter may be used instead of a phase modulator 112 to provide four simultaneous intensity measurements. Thus, only one frame may be needed to adjust or update a SLM to correct the aberrations in an optical beam. In this example, the total time for updating SLM 106 using spatial phase shifting would be 111 µs (9.0 kHz), which is represented by frame 3. Thus, a significant savings in time can be achieved by making only one measurement. According to one aspect, the present invention may be used in various markets such as in advanced sensors, data transmission and communications. According to another aspect, the present invention is related to adaptive optics, interferometers, phase shifters, MEMS, and deformable mirrors.

FIG. 3A illustrates a pixelated spatial phase shifter, in accordance with one embodiment of the present invention. Pixelated spatial phase shifter 300 may comprise a chip with a pixelated grid pattern, i.e., a checkerboard pattern. Each square may represent a pixel, for example pixels 304a, 304b, 304c, and 304d. A group of four pixels may form a section 302. Each section 302 may be identical to another section 302 of pixelated spatial phase shifter 300. Thus, pixelated spatial phase shifter 300 may comprise a repeating checkerboard pattern of identical sections 302. Within a section 302, each pixel may be etched to different depths corresponding to a different phase shift. For example, λ may represent the wavelength of an optical beam. In one example, λ may be 1.55 µm, and the accuracy of the depths may be 1 nm. Thus, pixel 304a may have a depth of 194 nm (⅛λ), pixel 304b may have a depth of 387 nm (¼λ), pixel 304c may have a depth of 581 nm (⅜λ), and pixel 304d may have a depth of 0 nm (0λ). The square dimensions of each pixel may be 150 µm×150 µm, with a center registration accuracy of 1 µm and a size accuracy of 1 µm. Although a 20×20 pixel checkerboard pattern is shown in FIG. 3A, a preferred embodiment of the present invention utilizes a 100×100 pixel checkerboard pattern or larger. The depths and dimensions of each pixel, as well as the wavelength may vary in size, and is not limited to only those values disclosed.

Figure 4A:
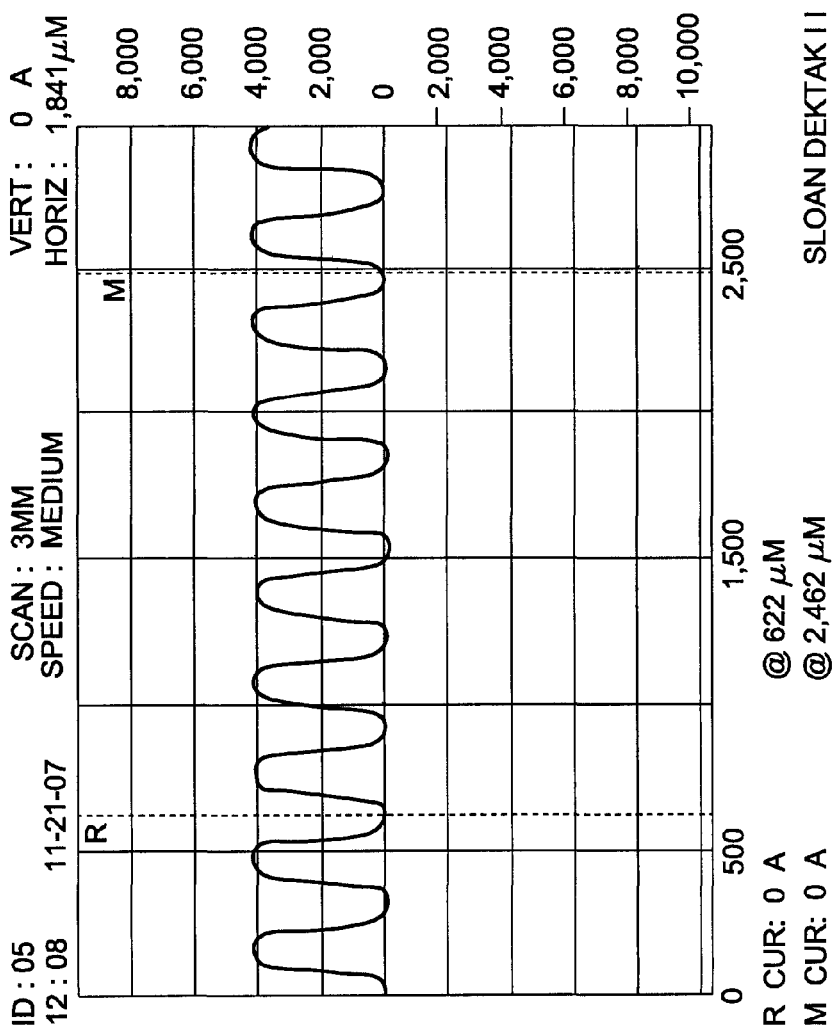
FIGS. 4A, 4B, 4C and 4D illustrate an example of profilometer measurements of a pixelated spatial phase shifter, in accordance with one aspect of the present invention.
Figure 4B:
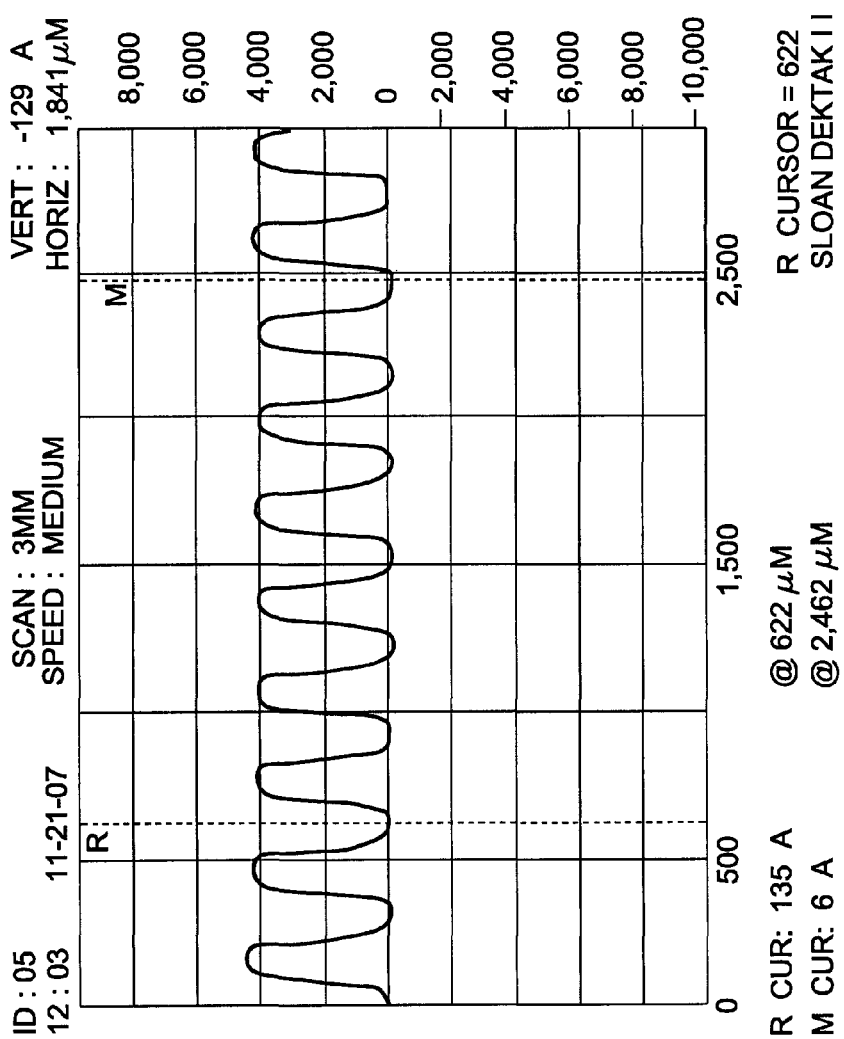
Figure 4C:
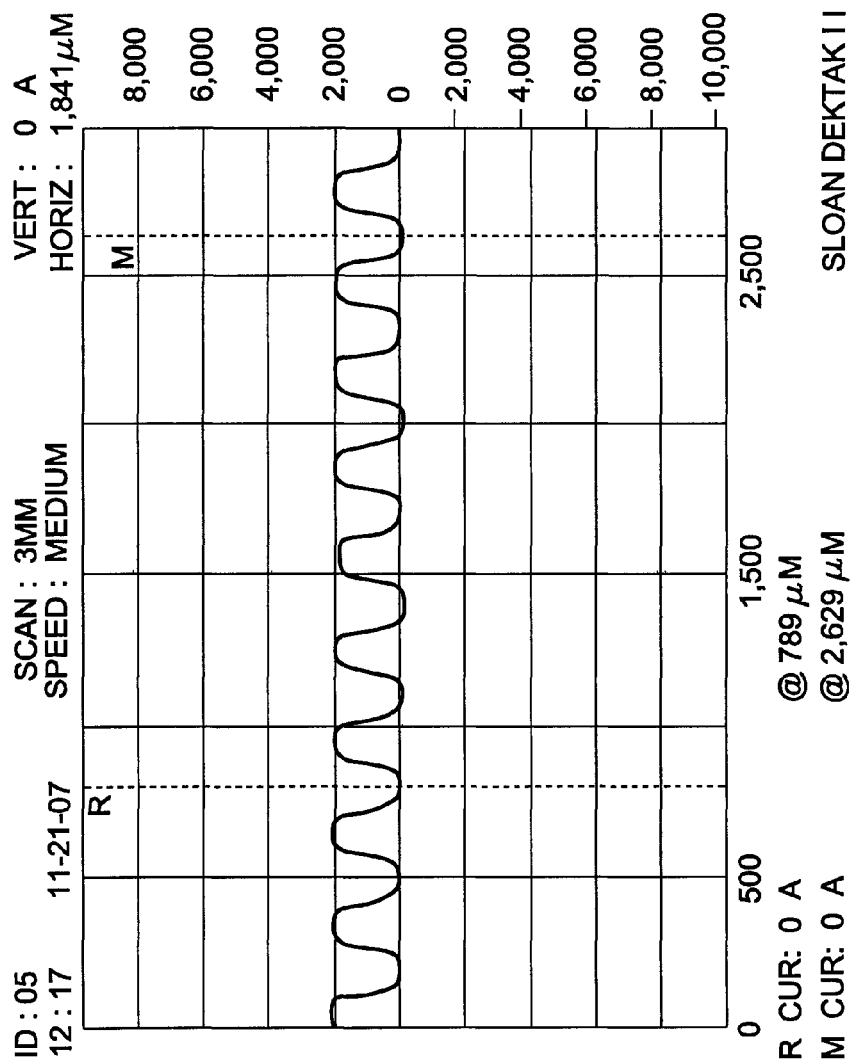
Figure 4D:
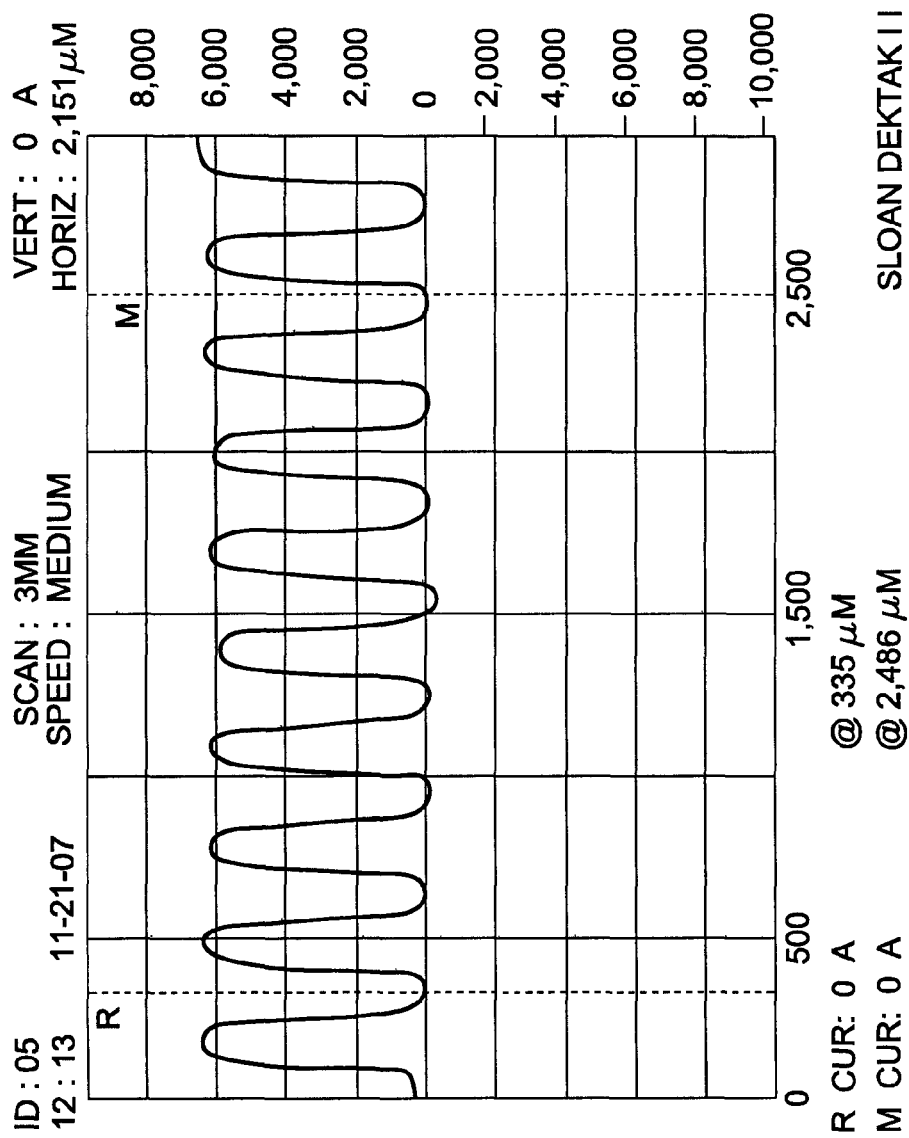

Profilometer measurements for an example pixelated spatial phase shifter is illustrated in FIGS. 4A, 4B, 4C and 4D, which show how the depths of each pixel varies with respect to one another. For example, FIG. 4A illustrates a 387 nm difference in depth between neighboring pixels along one column alternating between pixel 304a (194 nm) and pixel 304c (581 nm). FIG. 4B illustrates a 387 nm difference in depth between neighboring pixels along another column alternating between pixel 304b (387 nm) and pixel 304d (0 nm). FIG. 4C illustrates a 194 nm difference in depth between neighboring pixels along one row alternating between pixel 304a (194 nm) and pixel 304b (387 nm). FIG. 4D illustrates a 581 nm difference in depth between neighboring pixels along another row alternating between pixel 304c (581 nm) and pixel 304d (0 nm). Note that ideally, the patterns shown should resemble square waves, but because of limitations in the resolution associated with the profilometer, sinusoidal waves are shown instead.

In accordance with another embodiment of the present invention, pixelated spatial phase shifter 300 may be used to reflect light. The surface of each pixel may be a mirrored surface. Each pixel may be etched to a depth as required and then coated with a reflective coating. The reflective coating may be chromium, nickel, gold (such as 200 angstroms), any combination thereof, or any other suitable reflective coating. The thickness of the coating may need to be sufficient to reflect the majority of the light beam hitting the surface of the pixel. In an alternative embodiment of the present invention, pixelated spatial phase shifter 300 may transmit optical beams.

FIGS. 3B and 3C illustrate side views of pixelated spatial phase shifter 300. The pixels may be fabricated on a substrate 306. For example, substrate 306 may be a silicon wafer, or any other suitable substrate material as long as the substrate is sufficiently rigid and can maintain its shape. The substrate may have a thickness of 1-5 mm, but other thicknesses may be utilized.

According to one aspect of the present invention, pixelated spatial phase shifter 300 may be used to spatially phase shift optical beams. For example, pixelated spatial phase shifter 300 may be inserted into either the signal beam or the reference beam of an interferogram. The wavefront of the beam reflected from pixelated spatial phase shifter 300 is thus modulated spatially. Assuming the phase of the incoming signal beam is uniform within each section 302, a simultaneous measurement of the four intensities of the four pixels in each section 302 can be made in a single frame of an imaging device capturing the interferograms. Thus, a phase can be deduced for each section 302.

In accordance with one aspect of the present invention, pixelated spatial phase shifter 300 may be used with an adaptive optics system similar to adaptive optics system 100. However, instead of using a phase modulator 112 to temporally shift the phase of the reference beams, pixelated spatial phase shifter 300 may be used. Each section 302 may be aligned to a corresponding one of the actuators 106a of SLM 106 (i.e., a single MEMS element). In one aspect, the ratio of sections 302 of pixelated spatial phase shifter 300 to the actuators of SLM 106 is at least 1:1. In another aspect, the ratio of pixels of pixelated spatial phase shifter 300 to the actuators of SLM 106 is greater than 1:1. In yet another aspect, the ratio of pixels of imaging device 116 to pixels of pixelated spatial phase shifter 300 is at least 1:1.

Thus, some approaches to overcome the bandwidth limitation problem of a temporal phase shifter involves other phase shifters that have many optical components, which may make the system complex and difficult to fine tune and align. For example, adaptive optics systems utilizing spatial phase shifters constructed by splitting the beams and making duplicate copies of the interferogram, with the relative phase in each interferogram altered by a known amount, makes the overall system cumbersome, difficult to align, unstable, and difficult to construct. Other approaches also require many components such as active components to maintain a precise phase shift. In accordance with one aspect of the present invention, one advantage of using a pixelated spatial phase shifter 300 in an adaptive optics system is that the design is compact and simple, involving the addition of one passive component.

Figure 5:
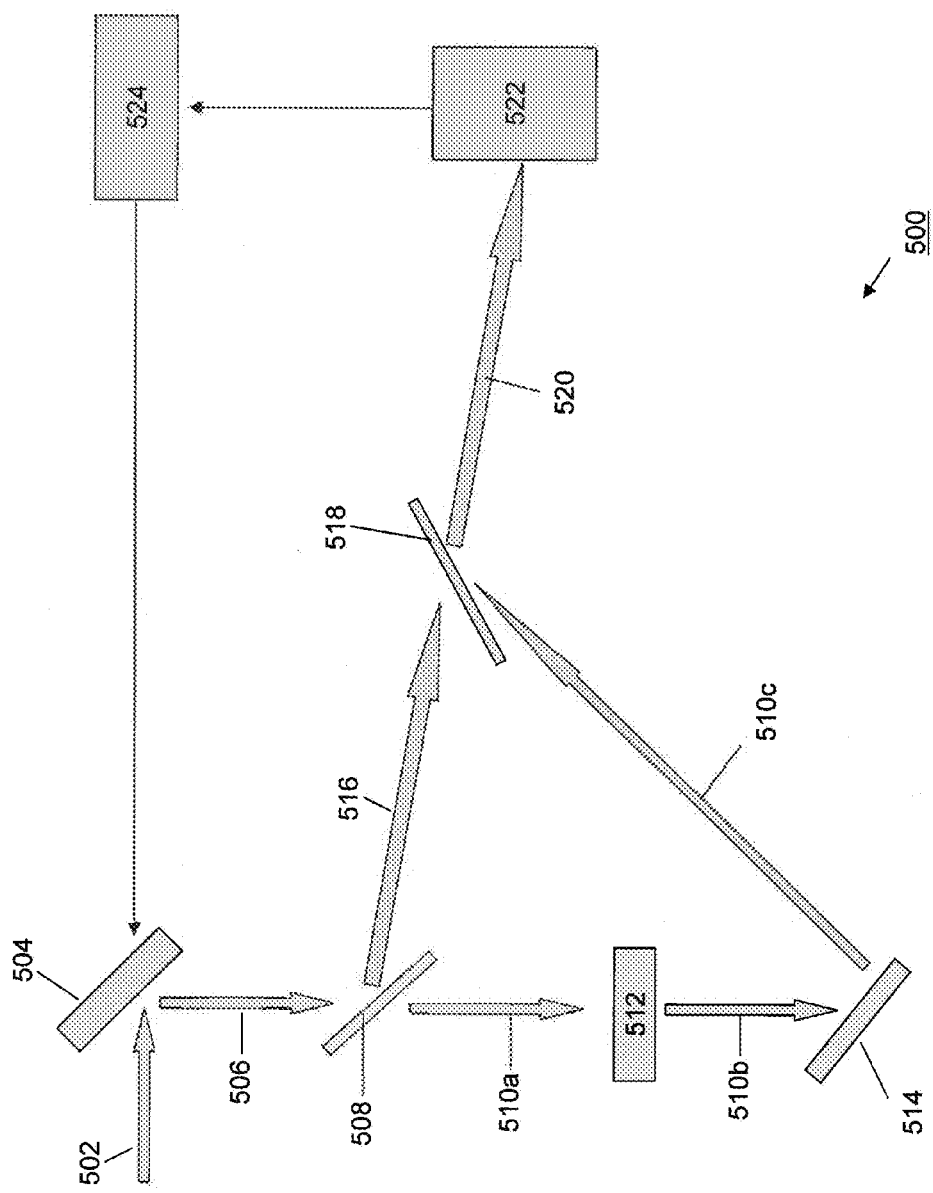
FIG. 5 illustrates an example of an adaptive optics system utilizing a spatial phase shifter, in accordance with one embodiment of the present invention.

FIG. 5 illustrates an example of an adaptive optics system 500 utilizing a spatial phase shifter, according to one embodiment of the present invention. Adaptive optics system 500 includes SLM 504 (i.e., MEMS), which mitigates the aberrations of incoming beam 502 and redirects it to a beamsplitter 508. Beamsplitter 508 splits the redirected beam 506 into two substantially identical beams 516 and 510a. Beam 510a is spatially filtered by spatial filter 512 to produce a reference beam 510b with a flat phase. For example, spatial filter 512 cleans up the wavefront of beam 510a. Spatial filter 512 can be a single mode fiber that has a geometry that permits only a lowest order mode (i.e., the lowest order solution to the wave equation that satisfies the boundary conditions) to travel through the fiber. All other higher modes either radiate or dissipate at the boundary of the single mode fiber. Spatial phase shifter 514 reflects reference beam 510b, producing a phase-shifted reference beam 510c. For example, the wavefront of reference beam 510b is phase shifted by spatial phase shifter 514. In accordance with one aspect of the present invention, spatial phase shifter 514 may be a pixelated spatial phase shifter 300. Beam combiner 518 may combine (i.e., interfere) phase-shifted reference beam 510c with beam 516, and direct combined beam 520 to an image plane of imaging device 522.

By interfering beam 516 with phase-shifted reference beam 510c, multiple interferograms may be formed in imaging device 522, which captures an image of the multiple interferograms in a single frame and provides it to processor 524. In accordance with various aspects of the present invention, imaging device 522 may be a CCD, a CMOS, or any other imaging device known to those of skill in the art. Processor 524 may be configured to reconstruct the wavefront of incoming beam 502 based upon the captured multiple interferograms. For example, processor 524 may figure out the wavefront information from the interferograms and use that information to drive SLM 504 to correct the wavefront of incoming beam 502.

SLM 504 may be a pixelated MEMS SLM. SLM 504 includes a plurality of independently adjustable actuators (see, e.g., actuators 106a of SLM 106 in FIG. 1). In one aspect, SLM 504 is constructed like SLM 106 of FIG. 1, in that SLM 504 comprises actuators that are the same as actuators 106a of SLM 106. Each actuator corresponds to one or more pixels of imaging device 522. According to one aspect of the present invention, a ratio of pixels of imaging device 522 to actuators of SLM 504 is greater than 1:1. For each pixel or group of pixels corresponding to an actuator of SLM 504, processor 524 calculates a phase aberration of the wavefront.

This phase aberration is then used to calculate a corresponding phase adjustment for the actuator to mitigate the detected aberration. According to one exemplary embodiment, the phase adjustment may be a modulus of the detected phase aberration divided by $2\pi$.

In the adaptive optics system of the present exemplary embodiment, the MEMS actuators are moved to mitigate phase aberrations in the incoming wavefront. As such, the average phase value of the overall wavefront is not critical. In one aspect, what is more important is the relative phase of the wavefront at one spatial point versus the phase at other points. Such a correction maintains the appropriate relative phase difference between the corrected region and adjacent regions the same as if an adjustment of $3\pi$ were provided (which adjustment might be beyond the operable range of the actuator).

According to one additional aspect of the present invention, to minimize the movement of the actuators, a dynamic control of the value of the average wavefront is applied. This leads to a reduced transient effect and improved bandwidth of the system. For example, to minimize the number of actuators that must be moved from one extreme of position to the other, the controller may be configured to maintain the average position of all of the actuators at about the mid-stroke position thereof. Expressed another way, the mitigated wavefront can be phased in one direction or another in order to keep the position of the actuators which require the most adjustment from reaching an utmost travel limit thereof. By maintaining a desired bias position of all of the actuators at an average middle position thereof (i.e., at a point farthest from their discontinuous operating points), the number of actuators which need to be adjusted from one extreme position to the other can be minimized, improving the overall performance of the system.

In accordance with one exemplary embodiment, in order to calculate a phase aberration corresponding to a given pixel or group of pixels (i.e., section 302), processor 524 may be configured as follows.

First, let $A_S e^{-j\phi_S} \equiv$ Signal Field and $A_R e^{-j\phi_R} \equiv$ Reference Field, such that $$I_S \equiv \text{Signal Intensity} = |\text{Signal Field}|^2 = A_S^2, \text{ and} \quad (1)$$

$$I_R \equiv \text{Reference Intensity} = |\text{Reference Field}|^2 = A_R^2. \quad (2)$$

Accordingly, the interference field and intensity can be calculated as follows:

$$A \equiv \text{Interference Field} = A_S e^{-j\phi_S} + A_R e^{-j\phi_R}, \text{ and} \quad (3)$$

$$I \equiv \text{Interference Intensity} = |A|^2 = I_S + I_R + 2\sqrt{I_S I_R} \cos(\phi_S - \phi_R), \quad (4)$$

where $\phi_S \equiv$ Signal Phase and $\phi_R \equiv$ Reference Phase.

Accordingly, the interference intensity can also be described as $$I = I_{DC} + I_{AC} \cos(\Delta\phi), \quad (5)$$

where $I_{DC} \equiv I_S + I_R$, $I_{AC} \equiv 2\sqrt{I_S I_R}$, $\Delta\phi \equiv \phi_S - \phi_R$.

Spatial phase shifter 514 may induce phase shifts in reference beam 510b to generate four intensity measurements in a single frame, where
$\theta_t \equiv$ Induced Phase Shift in Reference Beam:

$$I_t = I_{DC} + I_{AC} \cos(\Delta\phi + \theta_t), \quad (6)$$

such that $$I_1 = I_{DC} + I_{AC} \cos(\Delta\phi)$$

$$I_2 = I_{DC} - I_{AC} \sin(\Delta\phi)$$

$$I_3 = I_{DC} - I_{AC} \cos(\Delta\phi)$$

$$I_4 = I_{DC} + I_{AC} \sin(\Delta\phi) \qquad (7)$$

where $\theta_t = \{0\ \pi/2\ \pi\ 3\pi/2\}$, $t = \{1\ 2\ 3\ 4\}$.

Processor 524 may then be configured to generate subaperture phase error vectors with following components:

$x$ component $= I_1 - I_3$ $y$ component $= I_4 - I_2$

Processor 524 may then normalize each vector to unity length and sum the vectors to generate a bias vector. Processor 524 may calculate an arc tan of the resulting phase correction vectors to generate scalar values in radians:

$$\Delta\varphi = \arctan\left(\frac{y}{x}\right). \qquad (8)$$

Next, processor 524 may pass the phase correction values into an integrator to update the phase position placement of the actuators of SLM 504. According to one aspect, processor 524 may also adjust the gain and other filter settings to obtain optimal performance with respect to dynamics and noise in system. For example, a first order infinite impulse response ("IIR") filter with a gain of 0.8 and no second term feed forward path may be utilized, in accordance with one exemplary aspect of the present invention.

Next, processor 524 may be configured to calculate the bias from all integrator outputs and to generate a difference from the desired bias. According to one aspect, the desired bias should be set to the actuator mid-phase position level (i.e., furthest away from all discontinuous operating points). The difference is then subtracted from all integrator outputs.

Processor 524 may be further configured to check each actuator's phase position and to determine if the value is out of range of actuator's voltage limits. If out of range, processor 524 may pull the out-of-range actuator's phase position back into its operating range by applying an appropriate $2\pi$ shift.

Before moving an actuator, processor 524 may be configured to determine a least distance necessary to adjust the phase position of the actuator, by "wrapping" the movement thereof. In this regard, processor 524 may be configured to check each actuators phase position and to determine if that value is greater than $\pi$ away from a previous phase position. If so, the actuator's phase position can be reduced by applying an appropriate $2\pi$ shift.

Once processor 524 has determined the appropriate actuator phase positions, it applies mapping to translate the actuator phase positions into actuator voltage levels and sends corresponding command signals to SLM 504. According to one aspect of the present invention, a linear and square term relationship may exist between the actuator voltage level and the desired actuator phase position.

Figure 6:
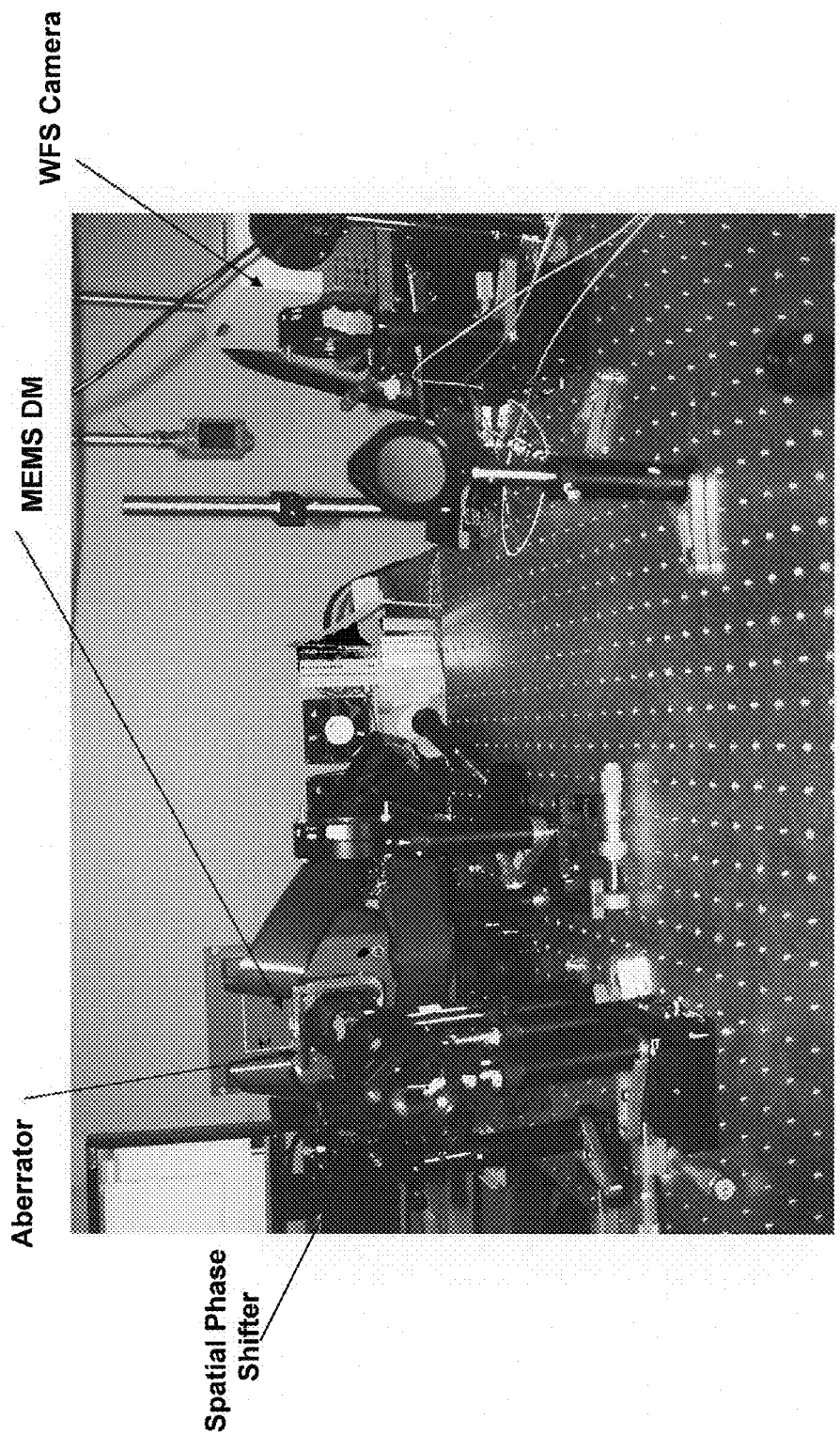
FIG. 6 illustrates an example of a test setup of an adaptive optics system utilizing a spatial phase shifter, in accordance with one embodiment of the present invention.

FIG. 6 illustrates an example of a test setup of an adaptive optics system utilizing a spatial phase shifter, in accordance with one embodiment of the present invention. For a test setup, a Michaelson interferometer may be utilized with Piezo on one arm, and a spatial phase shifter on the other. The Piezo may be moved or pistoned using a digital to analog card. For example, the Piezo may be driven by electric signals. With a Piezo, four intensities can be measured and the phase calculated. In this test setup example, each pixel of a pixelated spatial phase shifter (i.e., quadrant) may be mapped to a 5×5 pixel area of the imaging device such as a camera. The overlap error may be reduced by averaging over inside 3×3.

Figure 7:
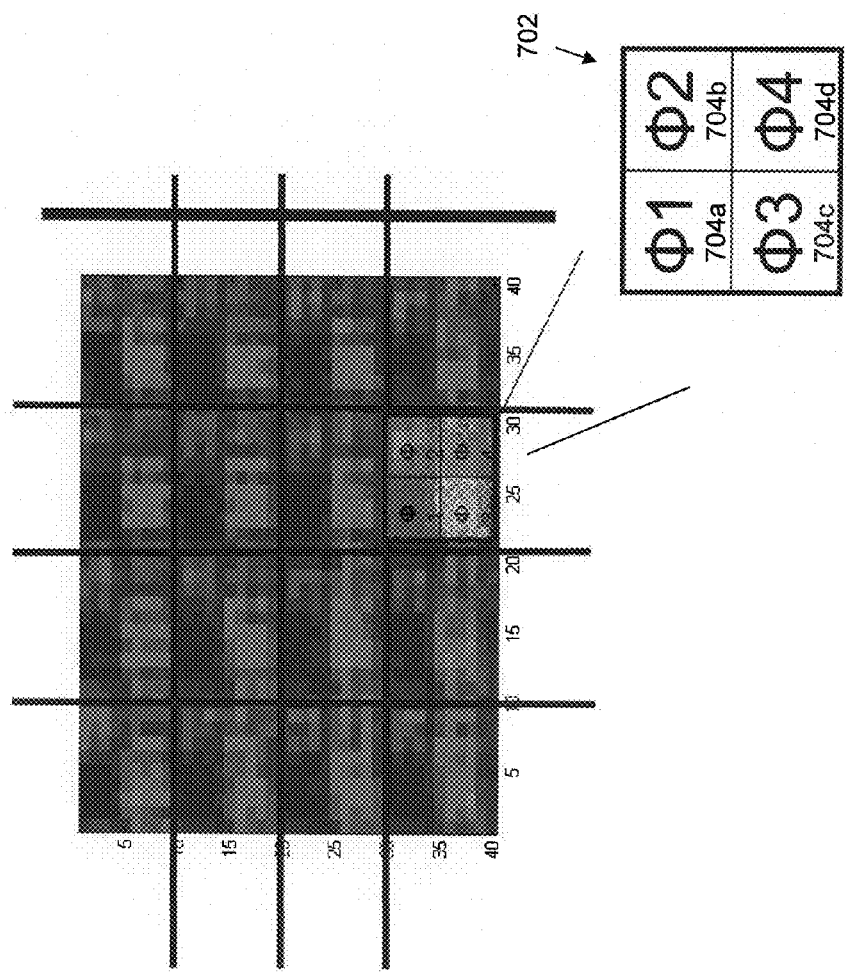
FIG. 7 illustrates an example of sample intensity measurements of an adaptive optics system utilizing a pixelated spatial phase shifter, in accordance with one embodiment of the present invention.

FIG. 7 illustrates an example of sample intensity measurements of an adaptive optics system utilizing a pixelated spatial phase shifter, in accordance with one embodiment of the present invention. Each axis shows the pixel numbers of the imaging device making these measurements. The image may be divided into regions 702, where each region 702 may correspond to a section of a pixelated spatial phase shifter (i.e., section 302). Each region 702 may also correspond to an actuator of a SLM. As shown in FIG. 7, the ratio of pixels of the imaging device to the pixels of a pixelated spatial phase shifter is at least 1:1. For example, a 5×5 pixel area of the imaging device may correspond to one pixel of a pixelated spatial phase shifter (i.e., pixel 304). Region 702 may further be divided into four sub-regions 704a, 704b, 704c, and 704d. Each sub-region 704 corresponds to a pixel of the pixelated spatial phase shifter and a corresponding phase shift (i.e., $\phi 1$, $\phi 2$, $\phi 3$, and $\phi 4$). Thus, a four phase algorithm based on intensities of phase shifted reference beams, which may be 90 degree phase shifts, in an interferometer (i.e., a SRI) may be used to calculate a wavefront sensor phase to correct for aberrations utilizing a SLM. This calculation may be performed by a processor, such as a field programmable array ("FPA"). According to one aspect of the present invention, a wavefront sensor phase may be calculated using equation 8 above.

Figures 8A, 8B:
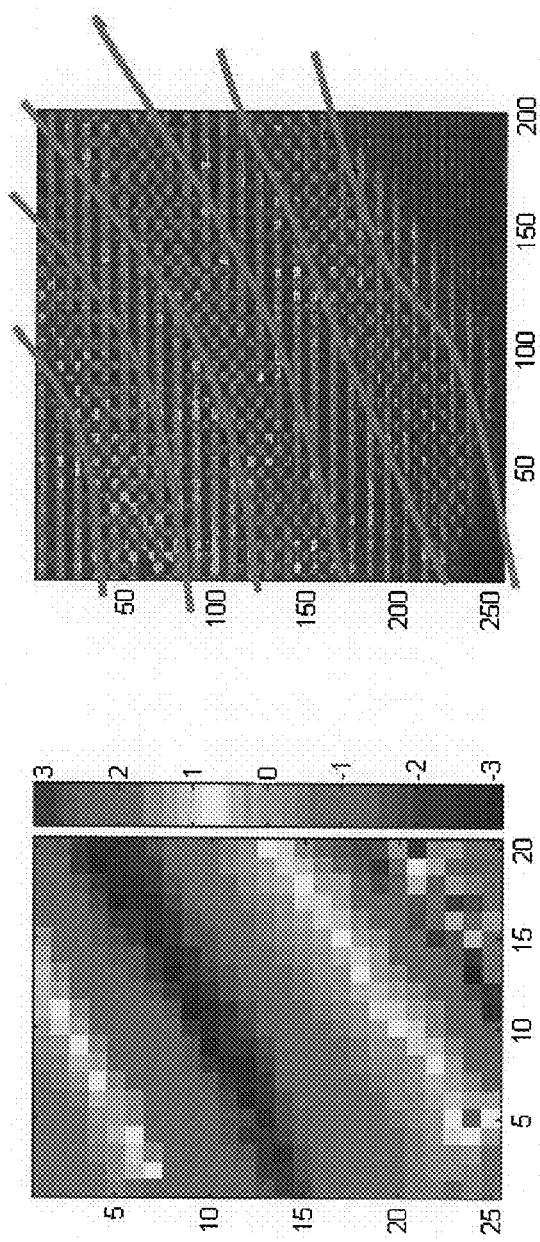
FIGS. 8A and 8B illustrate an example of a sample phase and intensity measurement of an adaptive optics system utilizing a pixelated spatial phase shifter, in accordance with one embodiment of the present invention.
Figure 9A:
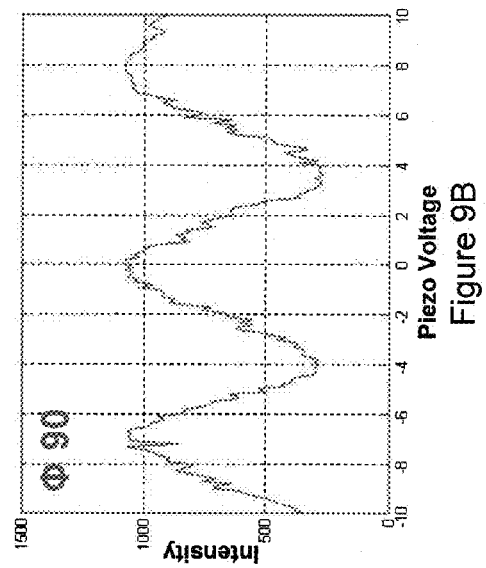
FIGS. 9A, 9B, 9C and 9D illustrate an example of sample intensity values of an adaptive optics system utilizing a pixelated spatial phase shifter, in accordance with one embodiment of the present invention.
Figure 9B:
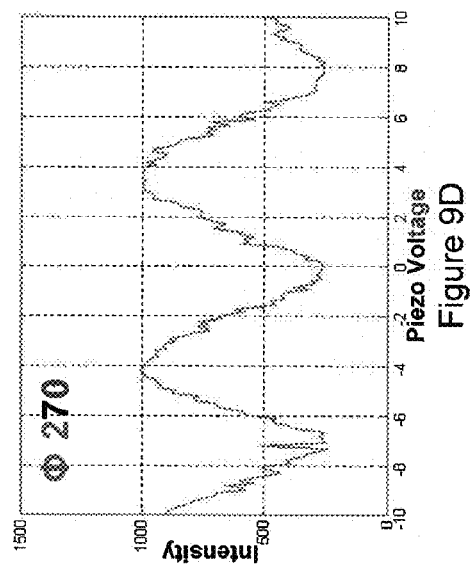
Figure 9C:
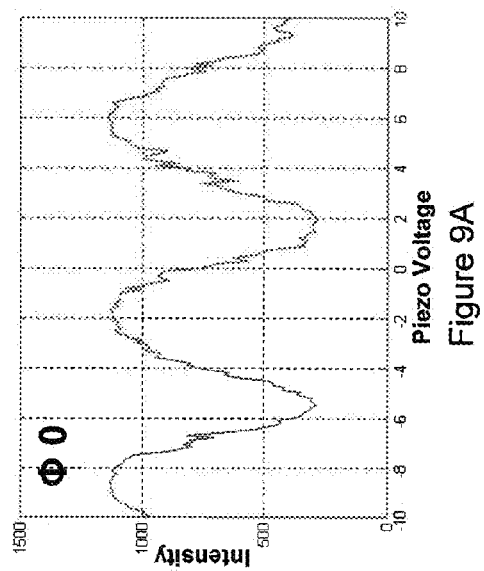
Figure 9D:
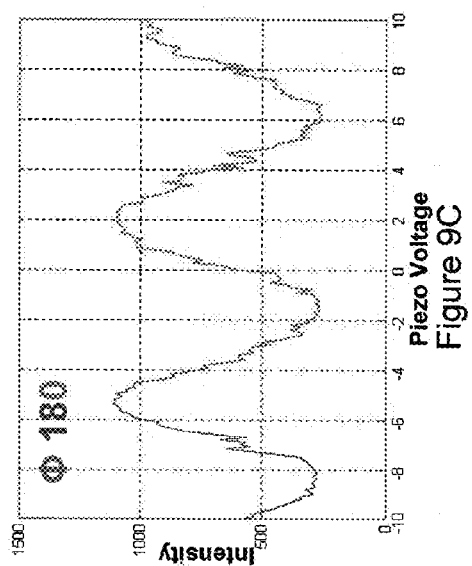

FIG. 8A illustrates an example of the calculated phase of a region of pixels using equation 9, in accordance with one aspect of the present invention. FIG. 8B illustrates an example of a sample intensity measurement by an imaging device of an adaptive optics system, in accordance with one aspect of the present invention. In FIG. 8A, each shade of color represents a different phase as indicated by the right vertical bar, which shows the range of the phase in radians. Both figures show a sample phase and intensity measurement associated with a sample wavefront. The wavefront can be seen as being tilted. In one aspect, areas with uniform shading represent phases that are substantially equal.

FIGS. 9A, 9B, 9C and 9D illustrate an example of sample intensity values of an adaptive optics system utilizing a pixelated spatial phase shifter, in accordance with one embodiment of the present invention. For example, FIGS. 9A, 9B, 9C and 9D show the measured average intensity on a sub-region of pixels to a ramp input to a Piezo mirror. Each sub-region is associated with a different shifted phase as shown. As the input to the Piezo changes, the intensity associated with each sub-region changes as well.

Figure 10:
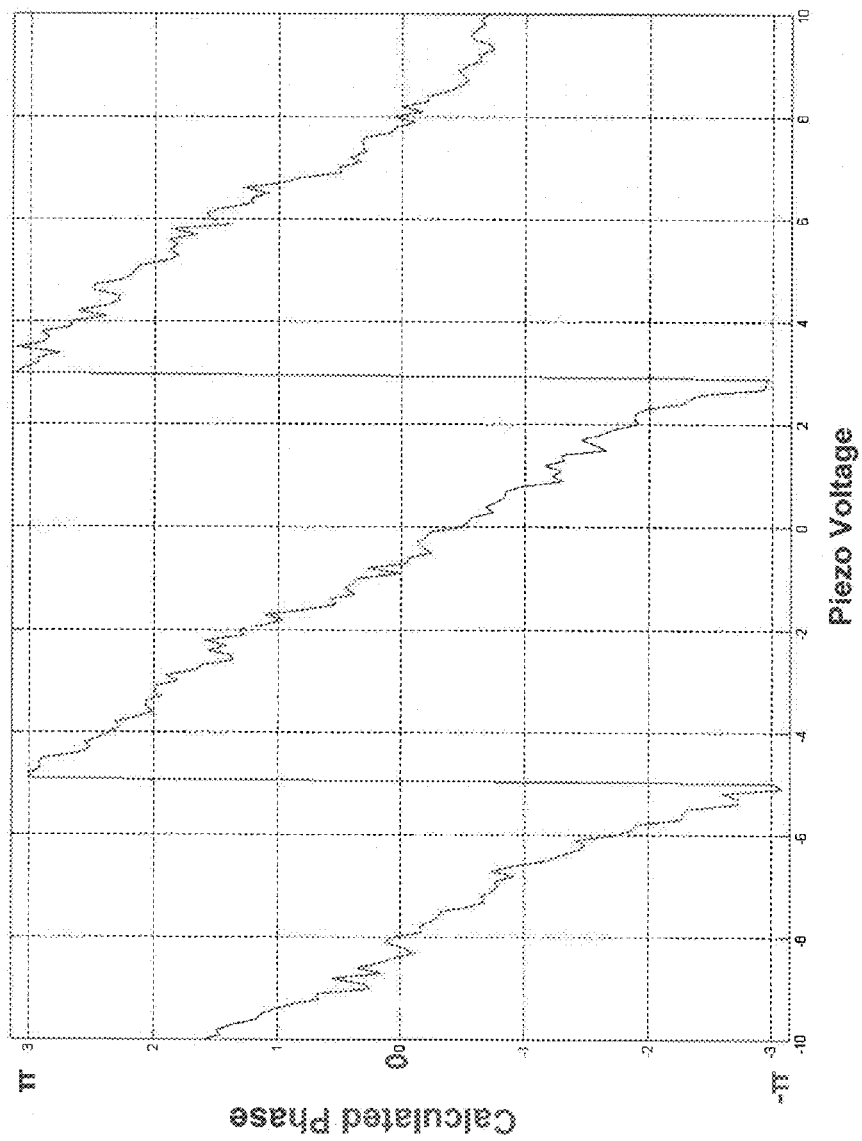
FIG. 10 illustrates an example of sample calculated phase values of an adaptive optics system utilizing a pixelated spatial phase shifter, in accordance with one embodiment of the present invention.

FIG. 10 illustrates an example of sample calculated phase values corresponding to the four intensities shown in FIGS. 9A, 9B, 9C and 9D, in accordance with one aspect of the present invention. As shown, the calculated phase varies linearly with the input provided to the Piezo. Note that the phase shown varies between a range of $2\pi$.

FIGS. 11A, 11B, 11C and 11D illustrate an example of performance results of an operation of an adaptive optics system utilizing a pixelated spatial phase shifter, in accordance with one embodiment of the present invention. Sub-regions 1102a, 1102b, 1102c, and 1102d illustrate the intensities measured at an imaging device, and each sub-region 1102 corresponds to a different phase-shifted reference beam, in accordance with one aspect of the present invention. The wavefront sensor phase, which may be the calculated or extracted phase using equation 9, is shown in region 1104. Region 1106 illustrates the voltage used to drive the SLM of an adaptive optics system to correct for the aberrations in the wavefront, in accordance with one aspect of the present invention. For example, region 1106 illustrates the voltage applied for the actuator command of the SLM.

FIG. 11A illustrates the performance results of an open loop adaptive optics system, in accordance with one aspect of the present invention. For example, the SLM does not receive any feedback from the processor to correct the aberrations in the wavefront during an open loop. Thus, there is no voltage applied to drive the SLM, as shown by the blank area of region 1106. As a result, the wavefront remains uncorrected, as shown by the varying phases of region 1104. In one aspect, because a wavefront is a collimated beam, the wavefront can be focused into a far field spot if the wavefront is flat. Otherwise, the beam cannot be focused. FIG. 11C illustrates that the uncorrected wavefront of FIG. 11A cannot be focused, in accordance with one aspect of the present invention.

FIG. 11B illustrates the performance results of a closed loop adaptive optics system, in accordance with one aspect of the present invention. For example, the SLM receives feedback from the processor to correct the aberrations in the wavefront during a closed loop. Thus, voltage is applied to drive the SLM, as shown by the varying voltage area of region 1106. The wavefront, in this example, is substantially corrected, as shown by the substantially uniform phase of region 1104. Thus, because this wavefront is substantially flat, the beam can be focused into a spot, as shown in FIG. 11D, in accordance with one aspect of the present invention.

Figure 12:
FIG. 12 illustrates an example of a method of performing correction of phase aberrations, in accordance with one embodiment of the present invention.

FIG. 12 illustrates a method S1200 of performing correction of phase aberrations. In accordance with one aspect of the present invention, method S1200 comprises modulating an incoming beam with an aberrated wavefront (S1202). Method S1200 further comprises dividing the modulated beam into a first beam and a second beam (S1204) and spatially phase shifting the second beam by at least two phases (S1206). Method S1200 further comprises interfering the spatially phase shifted second beam with the first beam to form at least two interferograms (S1208). Method S1200 further comprises capturing an image of the at least two interferograms in a single frame (S1210) and determining the aberrated wavefront based on the at least two interferograms (S1212). Method S1200 further comprises providing one or more control signals to mitigate aberrations in the aberrated wavefront (S1214).

Figure 13:
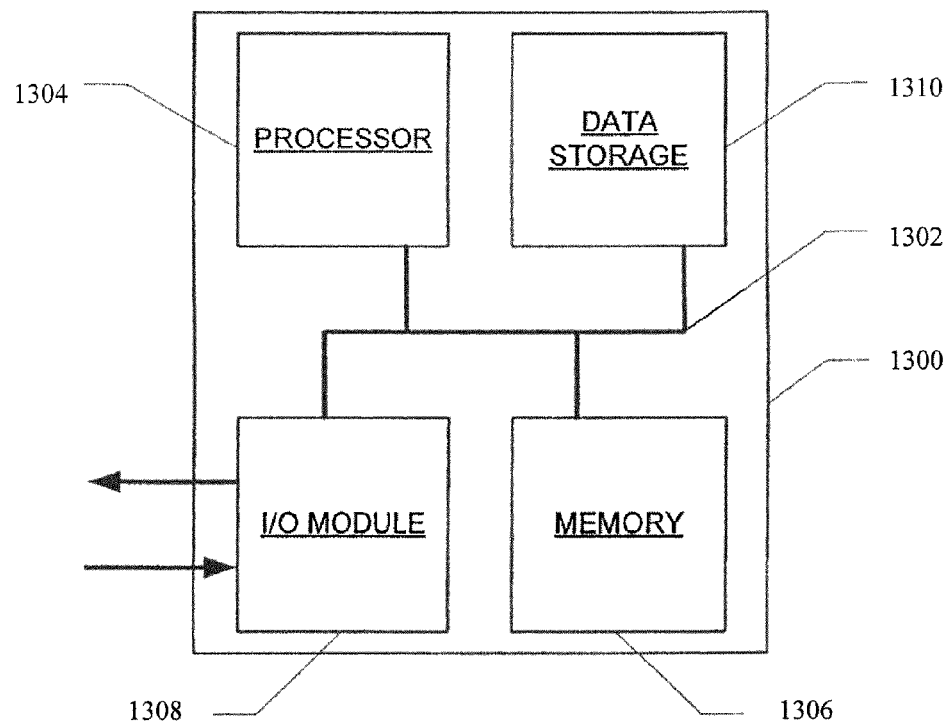
FIG. 13 is a block diagram illustrating an example of a computer system, in accordance with one embodiment of the present invention.

FIG. 13 is a block diagram illustrating an example of a computer system, in accordance with one embodiment of the present invention. In one aspect, a computer system 1300 may be utilized to implement an embodiment of the present invention. Computer system 1300 includes a bus 1302 or other communication mechanism for communicating information, and a processor 1304 coupled with bus 1302 for processing information. Computer system 1300 also includes a memory 1306, such as a random access memory ("RAM") or other dynamic storage device, coupled to bus 1302 for storing information and instructions to be executed by processor 1304. Memory 1306 may also be used for storing temporary variables or other intermediate information during execution of instructions by processor 1304. Computer system 1300 further includes a data storage device 1310, such as a magnetic disk or optical disk, coupled to bus 1302 for storing information and instructions.

Computer system 1300 may be coupled via I/O module 1308 to a display device (not illustrated), such as a cathode ray tube ("CRT") or liquid crystal display ("LCD") for displaying information to a computer user. An input device, such as, for example, a keyboard or a mouse may also be coupled to computer system 1300 via I/O module 1308 for communicating information and command selections to processor 1304. In one aspect, processor 524 of FIG. 5 may be represented by computer system 1300. In another aspect, processor 524 of FIG. 5 may be represented by processor 1304.

According to one embodiment of the present invention, adaptive optics correction is performed by a computer system 1300 in response to processor 1304 executing one or more sequences of one or more instructions contained in memory 1306. Such instructions may be read into memory 1306 from another machine-readable medium, such as data storage device 1310. Execution of the sequences of instructions contained in main memory 1306 causes processor 1304 to perform the process steps described herein. One or more processors in a multi-processing arrangement may also be employed to execute the sequences of instructions contained in memory 1306. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 1304 for execution. Such a medium may take many forms, including, but not limited to, non-volatile media, volatile media, and transmission media. Non-volatile media include, for example, optical or magnetic disks, such as data storage device 1310. Volatile media include dynamic memory, such as memory 1306. Transmission media include coaxial cables, copper wire, and fiber optics, including the wires that comprise bus 1302. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The phase aberration correction techniques described herein may be implemented by various means. For example, these techniques may be implemented in hardware, software, or a combination thereof. For a hardware implementation, the phase aberration correction techniques may be implemented by various optical components such as beamsplitters, beamcombiners, mirrors, polarizers, wave plates, lenses, fiber splitters, detectors, phase modulators, or other optical components designed to perform the functions described herein, or a combination thereof. The processing units used to determine and mitigate the aberrated wavefront of an optical beam may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the phase aberration correction techniques may be implemented with modules (e.g., procedures, functions, and so on) that perform the functions described herein. The software codes may be stored in a memory unit (e.g., memory 1306 and executed by a processor (e.g., processor 1304). The memory unit may be implemented within the processor or external to the processor, in which case it can be communicatively coupled to the processor via various means as is known in the art.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The description of the invention is provided to enable any person skilled in the art to practice the various configurations described herein. While the present invention has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An adaptive optics system, comprising:
   a spatial light modulator configured to modulate an incoming beam with an aberrated wavefront;
   a beamsplitter configured to receive the modulated beam from the spatial light modulator and to divide the modulated beam into a first beam and a second beam;
   a pixelated spatial phase shifter configured to spatially phase shift the second beam by at least two phases;
   a beam combiner configured to interfere the spatially phase shifted second beam with the first beam to form at least two interferograms on an imaging device;
   the imaging device configured to capture an image of the at least two interferograms in a single frame; and
   a processor configured to determine the aberrated wavefront based on the at least two interferograms, and to provide one or more control signals to the spatial light modulator to mitigate aberrations in the aberrated wavefront.

2. The adaptive optics system of claim 1, further comprising a spatial filter configured to spatially filter the second beam.

3. The adaptive optics system of claim 1, wherein the imaging device comprises an InGaAs charge-coupled device ("CCD").

4. The adaptive optics system of claim 1, wherein the spatial light modulator comprises a pixelated microelectromechanical system, the pixelated microelectromechanical system comprising actuators.

5. The adaptive optics system of claim 4, wherein a ratio of pixels of the pixelated spatial phase shifter to the actuators of the pixelated microelectromechanical system is greater than 1:1.

6. The adaptive optics system of claim 1, wherein a ratio of pixels of the imaging device to pixels of the pixelated spatial phase shifter is at least 1:1.

7. The adaptive optics system of claim 1, wherein the spatial light modulator comprises actuators, and wherein the processor is configured to adjust each of the actuators of the spatial light modulator by a modulus of a detected phase aberration for a corresponding pixel of the imaging device divided by $2\pi$.

8. The adaptive optics system of claim 1, wherein the spatial light modulator comprises actuators, and wherein the processor is configured to adjust the actuators of the spatial light modulator to positions relative to a desired biased position.

9. The adaptive optics system of claim 1, wherein the pixelated spatial phase shifter comprises a checkerboard pattern of sections, wherein each of the sections comprises at least three pixels of the pixelated spatial phase shifter, each pixel in each of the sections having a different depth corresponding to a different phase shift.

10. The adaptive optics system of claim 9, wherein each pixel in each of the sections results in a ¼, ½, ¾, or 0 wavelength phase shift.

11. The adaptive optics system of claim 9, wherein the spatial light modulator comprises a pixelated microelectromechanical system, the pixelated microelectromechanical system comprising actuators, and a ratio of the sections of the pixelated spatial phase shifter to the actuators of the pixelated microelectromechanical system is at least 1:1.

12. The adaptive optics system of claim 11, wherein each of the sections is aligned to a corresponding one of the actuators of the pixelated microelectromechanical system.

13. The adaptive optics system of claim 1, wherein the pixelated spatial phase shifter comprises a substrate and a reflective coating.

14. The adaptive optics system of claim 13, wherein the reflective coating comprises Ni, Gold, or a combination of Ni and Gold.

15. A method of performing adaptive optics correction, comprising:
  modulating an incoming beam with an aberrated wavefront;
  dividing the modulated beam into a first beam and a second beam;
  spatially phase shifting the second beam by at least two phases;
  interfering the spatially phase shifted second beam with the first beam to form at least two interferograms;
  capturing an image of the at least two interferograms in a single frame;
  determining the aberrated wavefront based on the at least two interferograms; and
  providing one or more control signals to mitigate aberrations in the aberrated wavefront.

16. The method of claim 15, further comprising spatially filtering the second beam.

17. The method of claim 15, wherein the determining comprises determining the aberrated wavefront based on the at least two interferograms in the single frame without utilizing interferograms from a subsequent frame.

18. An adaptive optics system, comprising:
  means for modulating an incoming beam with an aberrated wavefront;
  means for dividing the modulated beam into a first beam and a second beam;
  means for spatially phase shifting the second beam by at least two phases;
  means for interfering the spatially phase shifted second beam with the first beam to form at least two interferograms;
  means for capturing an image of the at least two interferograms in a single frame;
  means for determining the aberrated wavefront based on the at least two interferograms; and
  means for providing control signals to the means for modulating to mitigate aberrations in the aberrated wavefront.

19. The adaptive optics system of claim 18, further comprising means for spatially filtering the second beam.

20. The adaptive optics system of claim 18, wherein the means for modulating comprises a pixelated microelectromechanical system.

* * * * *